US005783799A

United States Patent [19]
Geissler

[11] Patent Number: 5,783,799
[45] Date of Patent: Jul. 21, 1998

[54] SERIES RESONANT CONVERTER, AND METHOD AND APPARATUS FOR CONTROL THEREOF

[75] Inventor: Steven J. Geissler, Appleton, Wis.

[73] Assignee: Illinois Tool Works Inc., Glenview, Ill.

[21] Appl. No.: 584,404

[22] Filed: Jan. 11, 1996

[51] Int. Cl.$^6$ .................................................. B23K 9/10
[52] U.S. Cl. ............................... 219/137 PS; 219/130.21; 219/663; 363/97
[58] Field of Search ..................... 219/137 PS, 130.21, 219/130.31, 130.32, 130.33, 130.51, 663, 665, 668; 363/78, 79, 95, 97

[56] References Cited

U.S. PATENT DOCUMENTS

| | | |
|---|---|---|
| Re. 33,866 | 3/1992 | Schutten et al. . |
| 4,465,920 | 8/1984 | Hoyt, Jr. et al. . |
| 4,769,754 | 9/1988 | Reynolds et al. . |
| 4,870,248 | 9/1989 | Gilliland . |
| 4,897,775 | 1/1990 | Klaassens . |
| 5,010,471 | 4/1991 | Klaassens et al. . |
| 5,075,836 | 12/1991 | Suzuki et al. ............................ 363/79 |
| 5,248,866 | 9/1993 | Tanaka et al. ............................ 219/663 |
| 5,270,914 | 12/1993 | Lauw et al. . |

FOREIGN PATENT DOCUMENTS

| | | | |
|---|---|---|---|
| 2284077 | 5/1995 | United Kingdom .............. | 219/130.21 |
| WO 94/09559 | 4/1994 | WIPO . | |

OTHER PUBLICATIONS

3rd European Conference On Power Electronics and Applications Vol. 1 Leonhard et al. Oct. 1989 8 pages.
M. Kim, M. Youn, "An Energy Feedback Control of Series Resonant Converters," *IEEE Trans. on Power Elecs.*, vol. 6, No. 3, Jul. 1991, pp. 338–345.
R. Oruganti, et al., "Implementation of Optimal Trajectory Control of Series Resonant Converters," *IEEE Trans. on Power Elecs.*, vol. 3, No. 3, Jul. 1988, pp. 318–327.
R. Oruganti, F. Lee, "Resonant Power Processors: Part I—State Plane Analysis," *IEEE-IAS-1984 Annual Meeting*, Sep. 30–Oct. 4, 1984, pp. 860–867.

*Primary Examiner*—Clifford C. Shaw
*Attorney, Agent, or Firm*—George R. Corrigan

[57] ABSTRACT

A welding power supply that includes a series resonant converter, including at least one switch and at least one capacitor is disclosed. The converter includes a switching circuit including an enable input. A voltage sensing circuit that determines the earliest safe switching time of the switch is provided. The safe switching time is the time that will prevent a peak voltage on the capacitor from exceeding a predetermined threshold for a next cycle of the converter. The voltage sensing circuit provides an enable signal to the enable input when the earliest switching time has passed, to enable the switching circuit. A pair of welding output terminals connected to the series resonant converter receives the output. A controller including a curve shaper, for providing a constant current output in the welding range is also disclosed. The controller also provides an adaptive hot start that provides varying amounts of energy in response to the welders skill.

34 Claims, 7 Drawing Sheets

SERIES RESONANT CONVERTER, AND METHOD AND APPARATUS FOR CONTROL THEREOF

BACKGROUND OF THE INVENTION

The present invention is directed toward a method and apparatus for controlling the output of a transformer isolated, constant current, series resonant converter.

In general, in conventional resonant converter designs, the switching of a combination of transistors (or equivalents) transfers energy from the input bus through a tank capacitor. During the time the switches are ON energy is transferred to the load and the capacitor, and the capacitor voltage builds up. During the time the switches are OFF the energy is transferred from the capacitor and the secondary to the output load, and the capacitor voltage bleeds down. An earlier firing angle (switching time relative to current zero crossing) increases the amount of energy put into the tank capacitor for subsequent transfer to the load, and decreases the time for voltage to be bled off the capacitor. Conversely, a later firing angle decreases the energy put into the tank for eventual transfer to the load, but allows greater time for the capacitor voltage to bleed down.

Prior art control schemes thus control the output by modulating the times the switches are turned on and off. Modulation is relatively inexpensive and easy to implement, but has a significant draw back: the tank is not protected during operation, and increasing tank voltages and currents may result in component failure.

More specifically, if the load does not remove all the stored energy, the energy in the tank capacitor will grow each time the switches turn ON, resulting in a continuous increase of tank voltages and currents that will eventually exceed the safe operating ranges for the components in the resonant converter. If the unsafe operating condition persists, the components will fail.

One prior art controller may be found in The Miller Electric Co. XMT® power supply and controls the output of a resonant converter in response to information derived from the output load current and the current in the switches of the resonant converter. Generally, the controller causes the firing angle to initially be at a safe (i.e. later) angle, and then causes the firing angle to "creep" earlier. As the firing angle becomes earlier, the voltage and current are monitored. If they become dangerous the angle is immediately increased to a much safer (later) time.

This tank control scheme, while better than other control schemes, has several shortcomings. First, the response time to increase the output is slow because the firing angle creeps forward. In other words, the XMT® controller commands the converter switches to turn OFF before it is actually required in an attempt to remain in the safe operating range of the components. Thus, the energy stored in the tank capacitor and available for transfer to the load is not necessarily the maximum safe amount of energy. As a result, the response to transients is slow, and maximum output cannot be maintained.

Second, the components might not be optimally used nor adequately protected because the amount of energy stored in, and the voltage developed across, the tank capacitor is not relied on to turn the switches ON and OFF.

Third, the XMT® controller further avoids unsafe operating condition by using components that are overrated for normal operating conditions. The use of overrated components increases both the cost and physical size of the power converter. Despite this safeguard, occasional transients, which exceed the average anticipated transient, could possibly create voltages in excess of the safe operating range of the components. Thus, the reliability of the existing method is compromised because the switches in the resonant converter are often damaged or destroyed.

A very complex method of control used in other technical fields is optimal trajectory control. Optimal trajectory control is a control scheme that calculates the firing angle necessary to obtain a specific desired tank current and voltage. This type of control is difficult and expensive.

Specifically, optimal trajectory control selects the optimal trajectory from a range of trajectories, and thus requires the solving of complex, multi-variable, four dimensional equations. Moreover, the equations typically include derivatives and integrals and are highly nonlinear. The electronics necessary to solve such complex equations are expensive and difficult to use.

Accordingly, a tank controller for a series resonant converter that transfers the maximum safe amount of energy to the load is desirable. Additionally, such a controller should be inexpensive and not require the solving of complex, multi-variable, high order equations. Specifically, it is desirable to use the low cost, low complexity aspect of modulation control schemes, but avoid the unsafe operation that is inherently allowed by modulation. Conversely, the safe, protective aspect of trajectory control is desirable, while the cost and complexity should be avoided. Also, the controller will preferably be capable of preventing transients or other high voltages from damaging components.

In addition to protecting the tank, it is desirable to control the power supply output and provide a desired V-A curve. Typically, prior art inverter power supply output V-A curves include a constant voltage portion at currents much less than the setpoint and a sloped portion having increasing current as voltage decreases near the operating range. Also, some machines provide a "dig" where the slope increases (greater increase of current for a given decrease in voltage) for lower than normal voltage operation. However, it is desirable in some welding processes (such as stick welding) to provide a constant current output.

Thus, it is desirable to provide a power supply that has a constant current portion of the output V-A curves, particularly at typical welding voltages. Additionally, it would be desirable to provide an adjustable slope dig.

Some prior art machines provide a boost of energy when the welding process is started, called a hot start. The hot start allows arc ignition without sticking of the arc. Typically, the excess energy provided by a power supply for a hot start was of fixed amplitude and duration. However, skilled welders typically require less energy for starting than beginners do. Thus, prior art hot starts were too hot for some users, and not hot enough for others. Accordingly, a tunable or adaptive hot start is desired.

SUMMARY OF THE INVENTION

The present invention addresses the problems associated with existing methods of controlling the output of a conventional series resonant converter by monitoring and maintaining the peak voltage developed on the tank capacitor independently of and in addition to monitoring the output current and the switch current.

Output current feedback provides information to a VCO which modulates the resonant converter switches. Switch current is monitored such that when the current exceeds a predetermined level, switching of the resonant converter is disabled. Furthermore, the switch current is monitored such that when the value of the current rings through zero, an independent monitoring circuit stores the value of the peak voltage developed across the tank capacitor. This capacitor voltage monitoring circuit then provides an appropriate signal that overrides the VCO control such that excessive voltages in the resonant converter can be prevented while maximum energy can be stored in the tank capacitor.

As a result, because the peak tank capacitor voltage is monitored and maintained, maximum energy can be transferred to the output load in a minimum amount of time. Also, control of switching based on the actual energy stored in the capacitor increases the transient response of the circuit. In addition, control of the voltage developed across the tank capacitor limits the stress on the components used, thus increasing overall circuit reliability and maximizing the use of the components selected. Overall, the present invention optimizes circuit performance and response time, while decreasing costs through increased reliability and optimal component selection.

Other principal features and advantages of the invention will become apparent to those skilled in the art upon review of the following drawings, the detailed description and the appended claims.

Figure 1:
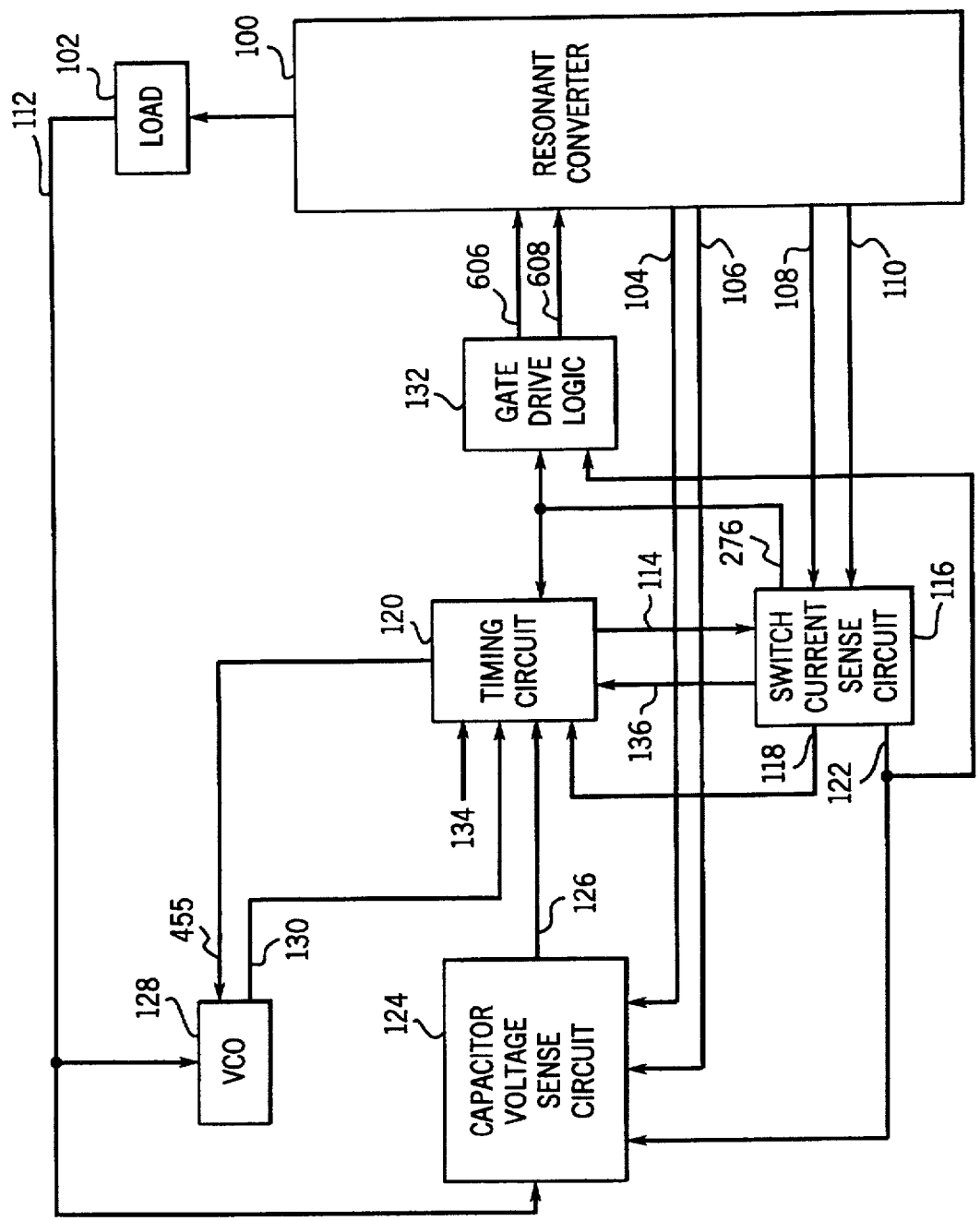
FIG. 1 is a block diagram representing a conventional series resonant converter and the associated control and monitoring circuits.

Before explaining at least one embodiment of the invention in detail, it is to be understood that the invention is not limited in its application to the details of construction and the arrangement of the components set forth in the following description or illustrated in the drawing. The invention is capable of other embodiments or being practiced or carried out in various ways. Also, it is to be understood that the phraseology and terminology employed herein is for the purpose of description and should not be regarded as limiting.

DETAILED DESCRIPTION OF A PREFERRED EXEMPLARY EMBODIMENT

The present invention is directed toward a transformer isolated, constant current, series resonant converter, such as one used to process power to produce a welding arc or to provide welding current to a welding arc, and a method and apparatus for controlling the converter. The power control circuit controls the output of the resonant converter by monitoring and maintaining the peak voltage developed across the tank capacitor in a conventional series resonant converter.

Safe operating conditions are insured by using a simplified trajectory control to limit the firing angle. However, the simplified trajectory control requires consideration of only one trajectory, the trajectory that is the earliest firing angle yet safe, and thus is relatively inexpensive and easy to implement. Because the trajectory control is simplified it acts only as an "enabling" control, and does not determine the specific control necessary to obtain the desired output. Thus, the tank control may be inexpensively and easily implemented.

The specific firing angle controls the output V-A curve shape of the power supply, and the selection of the angle is described in detail below. The two controls are used conjunctively, wherein the simplified trajectory control "enables" a firing angle, and the output control selects the specific firing angle.

More specifically, series resonant converters include, inter alia, a plurality of switches and an energy storage device, such as a capacitor. In operation, energy is transferred to the load by the resonant converter. As is well known in the art, the timing of turning the switches in a resonant converter ON and OFF controls the amount of power transferred.

The power output is controlled by monitoring and maintaining the peak voltage developed on the tank capacitor independently of and in addition to monitoring the output current and the switch current. So long as the components are not in danger, the converter switches are controlled to provide the desired output current. However, switch current and capacitor voltage are monitored such that when the peak voltage will exceed safe levels, switching of the resonant converter is disabled (or not enabled) until the tank voltage decreases. Because the control scheme can accurately determine the earliest safe time to switch, excessive voltages in the resonant converter can be prevented while maximum energy can be stored in the tank capacitor.

The controller must be able to predict the minimum firing angle that will still provide a safe peak tank capacitor voltage to balance both efficiency and safety. The fact that the peak voltage on the tank capacitor after the next firing will be equal to the peak energy in the system during the current cycle, plus the energy added to the tank capacitor from the bus, less the energy bled off the capacitor and provided to the load, is used by the controller to balance these concerns.

The energy added to the tank capacitor from the bus is a function of the bus voltage and is dependent on the difference between the bus voltage and the tank voltage. The energy bled off the capacitor and provided to the load is a function of the firing angle and the output welding current. Thus, for a given peak tank voltage, and for a given output current, there is a firing angle at which the tank voltage has bled down to, which will result in a safe peak voltage on the next cycle. This is referred to as the "cut-in" voltage.

Figure 7:
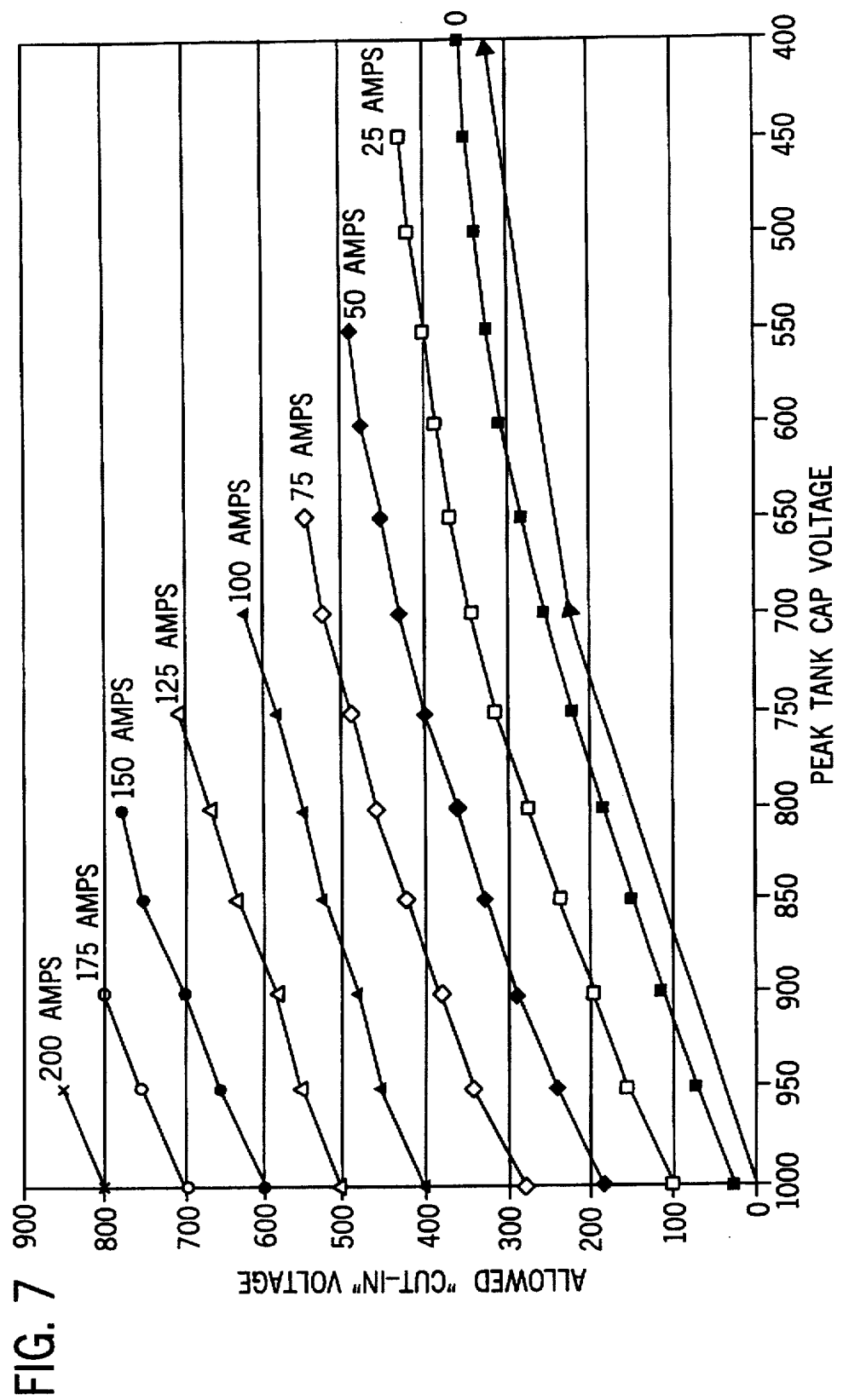
FIG. 7 is a graph showing safe cut-in voltages for various peak tank capacitor voltages and output currents.

Referring now to FIG. 7, empirical data has been collected that illustrates the allowed or safe cut-in voltage for a subsequent cycle, given a peak tank voltage in the present cycle. The data on FIG. 7 was generated for components having a maximum safe voltage of 1000 volts and includes data for a number of different output currents. For example, if the output current is 50 amps, and the peak tank voltage on the present cycle is 750 volts, the maximum voltage on the capacitor at which the switches may be turned ON in the subsequent cycle is 400 volts. Thus, if the tank capacitor voltage is not allowed to bleed down to at least 400 volts the subsequent peak capacitor voltage will be greater than the maximum safe level of 1000 volts. Therefore, the controller does not enable switching until the tank capacitor voltage has bled down to 400 volts or less. For this example, the switches are turned ON at the later of when the voltage has decreased to 400 volts and the firing angle determined in accordance with the output current feedback.

The data shown in FIG. 7 is transformer specific, but may be easily obtained empirically for any transformer. This data is then used by the controller, which may be an analog control circuit, a digital control circuit including a microprocessor and a look-up table, or a combination thereof. As one skilled in the art will recognize, there are many ways to implement the control scheme described above, and the data shown is merely exemplary, as is the circuitry described below.

Referring now to FIG. 1, a transformer isolated, constant current, series resonant converter, designated generally as 100, provides output power to a load. Series resonant converter 100 is well known in the art and includes, inter alia, one or more switches (not shown) and an energy storage device, such as a tank capacitor (also not shown). In operation, energy is alternately stored by resonant converter 100, and delivered by resonant converter 100 to the load. As is well known in the art, the timing of turning the switches in resonant converter 100 ON and OFF controls the amount of power stored and delivered.

A pair of signals 104 and 106, representing the differential voltage across the tank capacitor are provided to a capacitor voltage sense circuit 124 by series resonant converter 100. Also, series resonant converter 100 provides signals 108 and 110, representing the current in the converter switches to a switch current sense circuit 116. A signal 112 representing output load current is derived from output load 102 and provided to a voltage controlled oscillator (VCO) 128. Signals 104–112 are processed by various monitoring and control circuits, as will be described below in detail, to produce a gate drive signal 114 that is ultimately used to modulate the switches in resonant converter 100. As described above, the tank voltage and switch current are used to determine if a dangerously high voltage will be generated across the tank capacitor during the next cycle.

Generally speaking, switch current sense circuit 116 monitors signals 108 and 110. When the switch current exceeds a predetermined level, circuit 116 disables gate drive signal 114 by providing a signal 118 to a timing circuit 120. This protects the components in converter 100 from excessive currents.

To prevent the peak voltage from exceeding component limits the tank capacitor voltage is measured when it reaches its maximum value. This occurs when the switch current rings through zero. Thus, current sense circuit 116 sends a signal 122 to voltage sense circuit 124 when the value of the switch current rings through zero. In response, capacitor voltage sense circuit 124 monitors signals 104 and 106 which represent the differential voltage developed across the tank capacitor in resonant converter 100.

Voltage sense circuit 124 also processes signal 112 representing the load current. Voltage sense circuit 124 produces a signal 126 by processing the peak capacitor voltage information in conjunction with the load current information provided by signal 112. Signal 126 is sent to timing circuit 120 which then provides gate drive signal 114. As described briefly above, the switches in the resonant converter are not enabled until the tank capacitor voltage has bled down to a safe level.

The output of resonant converter 100 is further controlled by voltage controlled oscillator (VCO) 128. Modulation of VCO 128 is achieved by processing the output current information provided by signal 112. VCO 128 provides signal 130 to timing circuit 120 which then provides gate drive signal 114. The switching within resonant converter 100 is then controlled to provide a desired output current, subject to enablement in accordance with capacitor voltage circuit 124, as described above.

Gate drive signal 114 is processed by current sense circuit 116 which then provides modulated signal 276 to gate drive logic circuit 132. Drive signal 114 is modulated by either signal 130 produced by VCO 128 or signal 126 produced by capacitor voltage sense circuit 124. A signal 126 from voltage sense circuit 124 overrides signal 130 from VCO 128. That is, voltage sense circuit 124 can prevent the resonant converter from switching and thus prevents the voltage on the tank capacitor from exceeding a predetermined limit. Switching of the resonant converter is also prevented if timing circuit 120 receives an indication that the current through the switches is unsafe from signal 118, provided by current sense circuit 116. In addition, switching of the resonant converter is prevented timing if circuit 120 receives an appropriate indication from signal 134.

Figure 2:
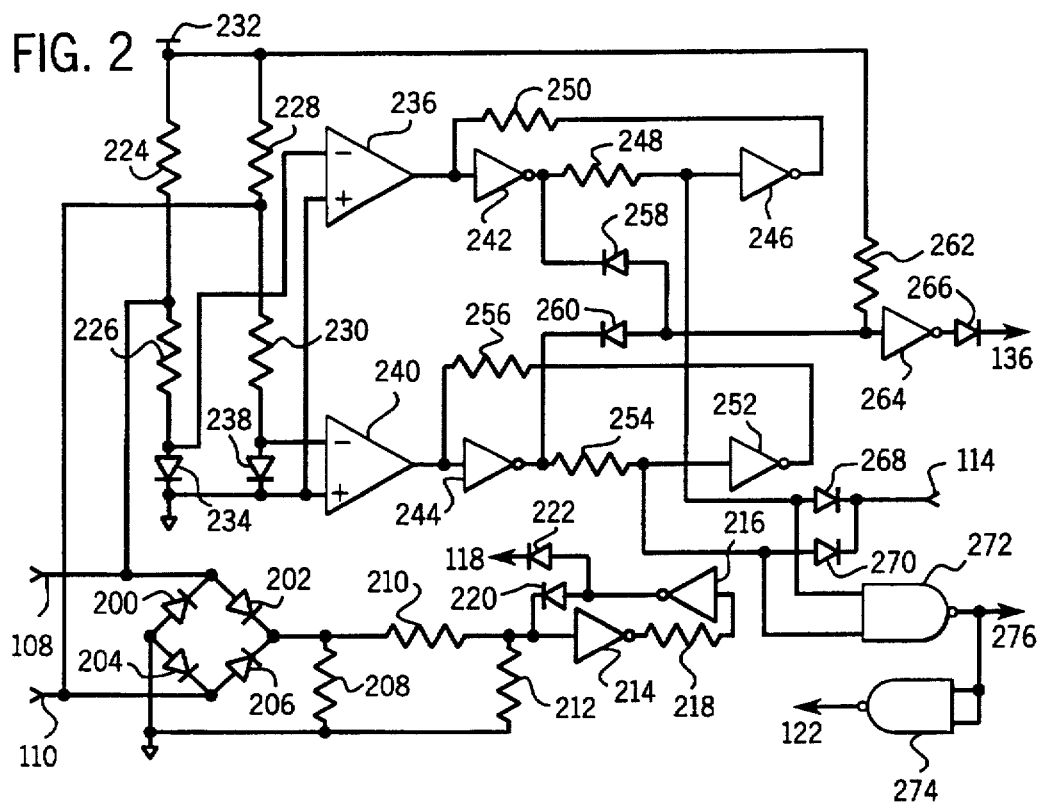
FIG. 2 is a schematic diagram of a preferred exemplary embodiment of the current sense circuit shown in FIG. 1.

Referring now to FIG. 2, signals 108 and 110, representing the current in the switches in resonant converter 100, are rectified by a full wave bridge, including diodes 200, 202, 204, and 206, which is terminated by burden resistor 208. The voltage developed across burden resistor 208 is further divided by resistors 210 and 212. The junction of resistors 210 and 212 is connected to the input of Schmitt trigger 214. The output of Schmitt trigger 214 is connected to the input of Schmitt trigger 216 by way of resistor 218. The output of Schmitt trigger 216 is connected to the anode of diode 220. The cathode of diode 220 is connected back to the input of Schmitt trigger 214. Thus, when the current in the switches reaches a threshold predetermined by the resistors 208–212, and the diode drop of diode 220, Schmitt trigger 214 is latched. The overcurrent latch signal 118 is provided to timing circuit 120 by way of the cathode of diode 222 which has its anode connected to the junction formed by diode 220 and Schmitt trigger 216.

Schmitt triggers 214 and 216 are not necessary, but help prevent damage to the switches and other components. More specifically, Schmitt triggers 214 and 216 serve to monitor the tank current and will shut down the converter in the event of unsafe current in the tank. Otherwise Schmitt triggers 214 and 216 remain inactive.

Signals 108 and 110 are also connected to the junctions of resistors 224 and 226, and resistors 228 and 230, respectively. Alternatively, signals 108 and 110 can be reversed because, as described below, the components connected to each signal mirror the components connected to the other signal. Resistors 224 and 226 are also connected to a positive voltage supply 232. Resistor 226 is also connected to the anode of diode 234 and the negative input of comparator 236. Resistor 230 is also connected to the anode of diode 238 and the negative input of comparator 240. The cathodes of diodes 234 and 238 and the positive inputs of comparators 236 and 240 are grounded.

The outputs of comparators 236 and 240 activate two Schmitt trigger latches. That is, the outputs of comparators 236 and 240 are connected to the inputs of Schmitt triggers 242 and 244, respectively. The output of Schmitt trigger 242 is connected to the input of Schmitt trigger 246 by way of resistor 248. The output of Schmitt trigger 246 is connected back to the input of Schmitt trigger 242 by way of resistor 250. Likewise, the output of Schmitt trigger 244 is connected to the input of Schmitt trigger 252 by way of resistor 254. The output of Schmitt trigger 252 is connected back to the input of Schmitt trigger 244 resistor 256.

The outputs of Schmitt triggers 242 and 244 are diode OR'ed by diodes 258 and 260, respectively. The anodes of diodes 258 and 260 are connected to resistor 262 and Schmitt trigger 264. The output of Schmitt trigger 264 connects to the anode of diode 266 having its cathode connected to timing circuit 120 by way of a resistor (not shown). Resistor 262 is also connected to positive voltage supply 232.

The inputs of Schmitt triggers 246 and 252 are connected to the anodes of diodes 268 and 270, respectively, and to the input pins of NAND gate 272. The cathodes of diodes 268 and 270 are connected together and may be pulled down by gate drive signal 114 produced by timing circuit 120. The output of NAND gate 272 produces modulated signal 276 and is connected to the two inputs of NAND gate 274 and timing circuit 120. The output of NAND gate 274 is also connected to gate drive logic 132 and to capacitor voltage sense circuit 124.

When the current in the switches in the resonant converter rings forward, the output of either comparator 236 or 240 pulls HIGH and releases the Schmitt trigger latch. At the same time, the output of Schmitt trigger 264 pulls HIGH and resets the running frequency of timing circuit 120.

When the current in the switches in the resonant converter rings through zero, the two inputs of NAND gate 272 receive a HIGH indication. Consequently, the output of NAND gate 274 changes to a HIGH state, indicating to the capacitor voltage sense circuit 124 that the current in the resonant converter has passed through zero and that the voltage across the tank capacitor has therefore reached a peak value.

Figure 3:
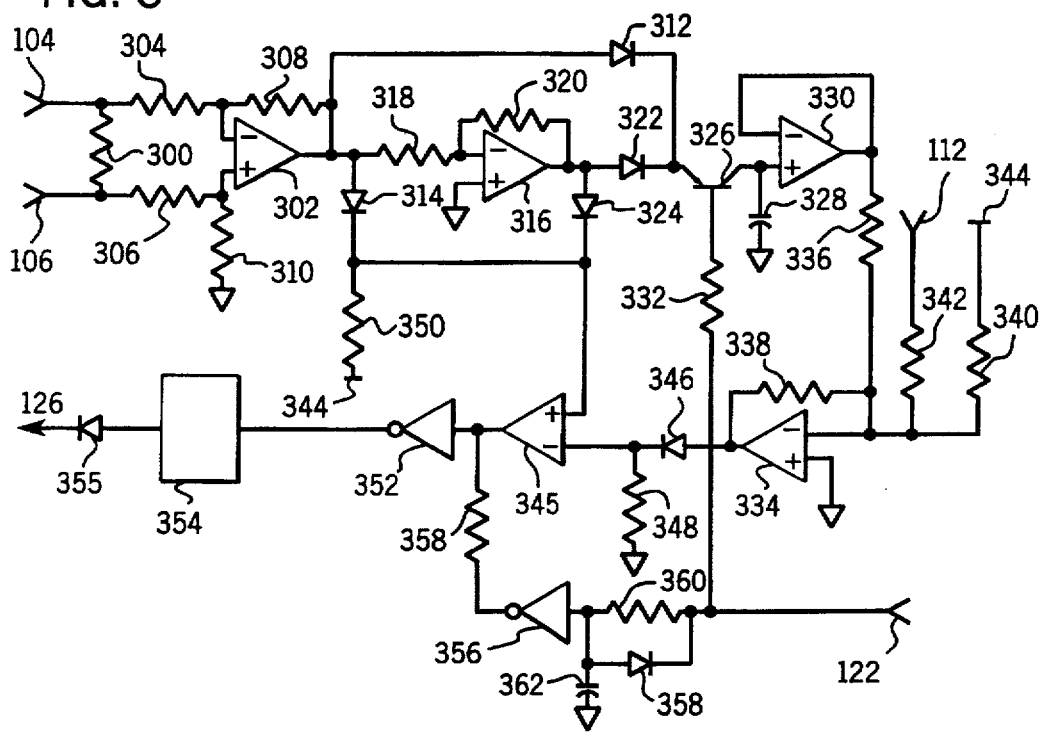
FIG. 3 is a schematic diagram of a preferred exemplary embodiment of the capacitor voltage sense circuit shown in FIG. 1.

Referring now to FIG. 3, signals 104 and 106, representing the voltage across the tank capacitor in resonant converter 100, are differentially measured by capacitor voltage sense circuit 124. Resistor 300, connected across signals 104 and 106, provides a bleed path for the tank capacitor voltage. Operational amplifier 302 and associated resistors 304, 306, 308, and 310 are configured as a conventional differential amplifier. The output of operational amplifier 302 thus represents a scaled down measurement of the differential voltage across the tank capacitor in resonant converter 100.

The output of operation amplifier 302 connects to the anodes of diodes 312 and 314 and to the negative input of operational amplifier 316 by way of resistor 318. Operational amplifier 316 and associated resistors 318 and 320 are configured as a conventional inverting amplifier having unity gain. The output of operational amplifier 316 is connected to the anodes of diodes 322 and 324. The cathode of diode 322 connects to the cathode of diode 312. The cathode of diode 324 connects to the cathode of diode 314. Thus, the voltage at the cathodes of each diode pair represents the scaled down absolute value of the differential voltage across the tank capacitor in resonant converter 100.

The cathodes of diodes 312 and 322 connect to the emitter of PNP transistor 326. The collector of transistor 326 connects to capacitor 328 and to the positive input of operational amplifier 330 which is configured as a conventional follower for use as a buffer. Capacitor 328 is also coupled to ground. The base of transistor 326 is driven through base resistor 332 by the output of NAND gate 274 in current sense circuit 116.

When the current in the switches in resonant converter 100 is ringing forward, transistor 326 is biased ON. Thus, the scaled down value of the differential voltage across the tank capacitor charges capacitor 328. When the current in the switches rings through zero, transistor 326 is biased OFF. At that moment, the voltage stored on capacitor 328 (and consequently the voltage at the output of follower amplifier 330) represents the peak voltage across the tank capacitor in resonant converter 100.

The output of amplifier 330 feeds into operational amplifier 334 by way of resistor 336. Resistor 336 is also connected to the junction of the inverting input of amplifier 334 and resistors 338, 340, and 342. Resistor 338 is also connected to the output of amplifier 334. Resistor 340 is also connected to negative voltage supply 344, and the resistor 342 is also connected to signal 112, which represents the output load current. The noninverting input of amplifier 334 is grounded.

The gain of amplifier 334 is determined by the combination of resistors 336, 338, 340, and 342 which are selected to maintain the peak voltages in resonant converter 100 within safe operating ranges while at the same time maximizing the amount of energy stored in the tank capacitor during given output loading and input bus conditions. Thus, in the preferred embodiment the curves of FIG. 7 are implemented using appropriate resistor values.

Resistor 336 and the output of amplifier 330 provide information about the peak voltage in resonant converter 100. Resistor 340 and negative voltage supply 344 provide a DC offset voltage for the condition where amplifier 334 is not receiving output load current information from signal 112. When output load current information is available, signal 112 and resistor 342 provide additional DC offset voltages dependent on the value of the load current.

Comparator 345 compares the output of amplifier 334 to the absolute value of the continuously monitored differential tank capacitor voltage. The output of amplifier 334 is connected to the anode of diode 346 which has its cathode connected to the inverting input of comparator 345. Resistor 348 is also connected to this junction and to ground. The noninverting input of comparator 345 connects to the junction formed by the cathodes of diodes 314 and 324 and resistor 350. Resistor 350 is also attached to negative power source 344. The output of comparator 345 is connected to the input of Schmitt trigger 352. The output of Schmitt trigger 352 is connected to the RESET input of D flipflop 354 which is configured in a conventional manner. The output of D flipflop 354 is connected to the anode of diode 355 which couples switch disabling information to timing circuit 120.

When the absolute value of the peak voltage across the tank capacitor exceeds the threshold level determined by operational amplifier 334 and its associated components, diode 355 is forward biased and couples a switch disabling signal to timing circuit 120. When the absolute value of the tank capacitor voltage falls below the threshold, diode 355 is reverse biased thus indicating to timing circuit 120 that the voltage has dropped to a level where it is safe to turn ON the switches in resonant converter 100 and store energy in the tank capacitor, and the switching is enabled.

The output of comparator 345 is also connected to the output of Schmitt trigger by way of resistor 358. The input of Schmitt trigger 356 is connected to the junction formed by the anode of diode 358, resistor 360, and capacitor 362. Schmitt trigger 356 and resistor 358 are not necessary, but serve to limit the on-time of the drive circuitry in the event there is no zero-crossing. This helps to protect components on the control board.

The triggers operate as follows: capacitor 362 is also returned to ground. Resistor 360 is also connected to the cathode of diode 358 and to the output of NAND gate 274 in current sense circuit 116. When the current in the switches in resonant converter 100 passes through zero, the output of NAND gate 274 changes to a HIGH state and capacitor 362 begins to charge through resistor 360. After an appropriate delay determined by the RC time constant of resistor 360 and capacitor 362, the threshold of Schmitt trigger 356 is reached, diode 355 is reverse biased, and timing circuit 120 consequently enables the switching of the switches in resonant converter 100. Diode 358 provides a discharge path for capacitor 362 when the output of NAND gate 274 changes to a LOW state.

Figure 4:
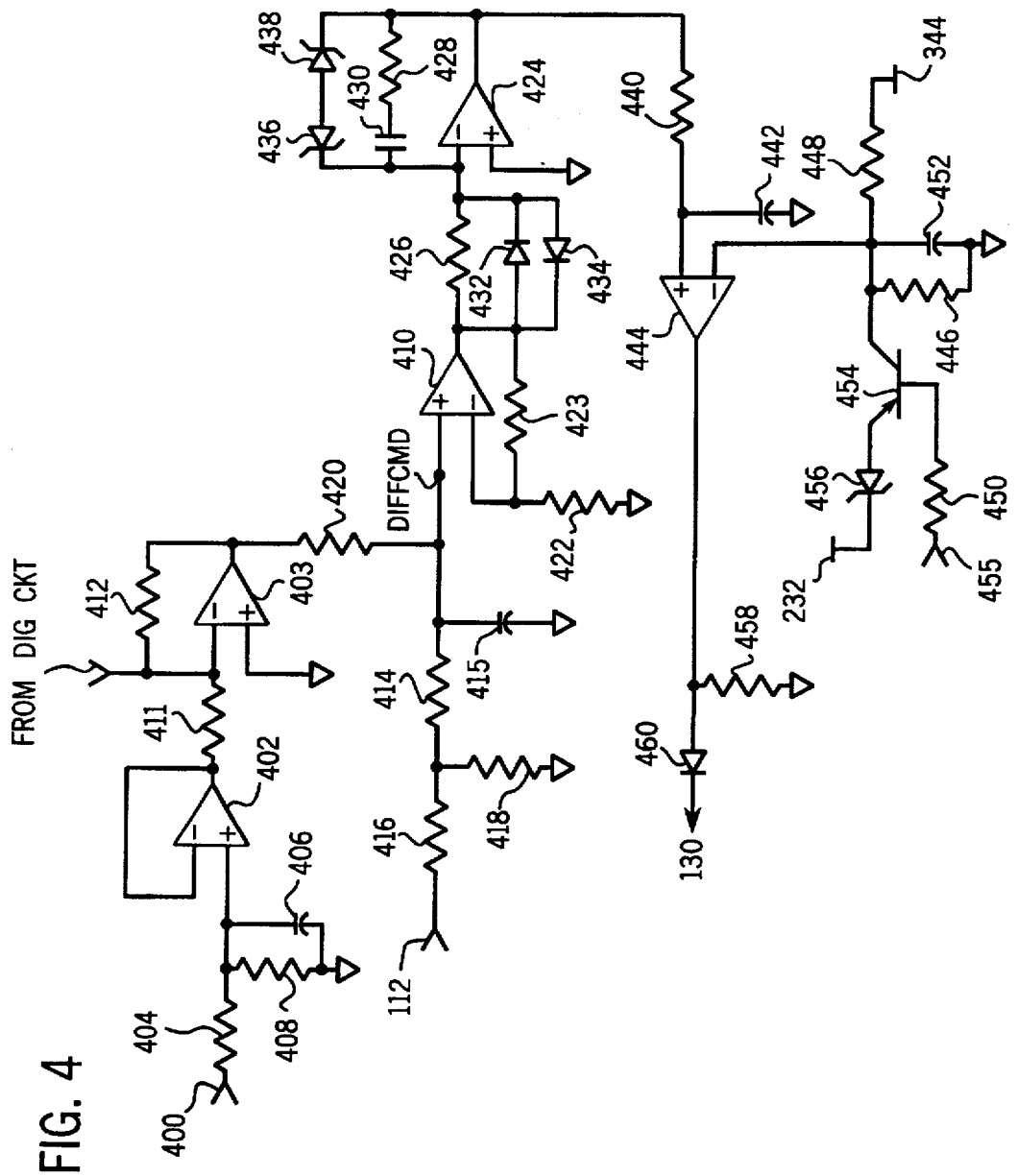
FIG. 4 is a schematic diagram of a preferred exemplary embodiment of the voltage controlled oscillator (VCO) shown in FIG. 1.

Referring now to FIG. 4, during the times when capacitor voltage sense circuit 124 is not providing an overriding switch enabling signal to timing circuit 120, VCO 128 controls the output of resonant converter 100 by monitoring signal 112, which represents the output load current. Signal 112 is monitored by a difference amplifier which measures the difference between signal 112 and command signal 400.

Command signal 400 is connected to the noninverting input of operational amplifier 402 by a resistor 404. The noninverting input is also connected to the parallel combination of a resistor 406 and a capacitor 408. The parallel combination is grounded at one end. Amplifier 402 is configured as a follower in a conventional manner. The output of amplifier 402 is summed with the output of the DIG/SLOPE (from switch 823 of FIG. 8) circuit by an inverting amplifier 403. A pair of associated resistors 411 (200K ohms) and 412 (200K ohms) are configured in a conventional manner. The output of amplifier 403 is summed with signal 112 by a difference amplifier 410 which has associated components configured in a conventional manner. The associated components include resistors 414, 416, 418, 420, 422 and 423 (10K ohms), and capacitor 415 (22 pF). The output of difference amplifier 410 connects to error and compensation amplifier 424 which has associated components configured in a conventional manner. The associated components include resistors 426 and 428, capacitor 430, diodes 432 and 434, and voltage limiting protection zeners 436 and 438. The output of error and compensation amplifier 424 is filtered by resistor 440 and capacitor 442.

Comparator 444 compares the output of error and compensation amplifier 424 with a ramp generated by resistors 446, 448, and 450, capacitor 452, PNP switching transistor 454 which receives a clocking signal 455 from timing circuit 120, and zener diode 456. The output of comparator 444 provides a modulated drive signal to timing circuit 120 by way of diode 460. The output of comparator 444 is also connected to resistor 458 which is also connected to ground.

Figure 5:
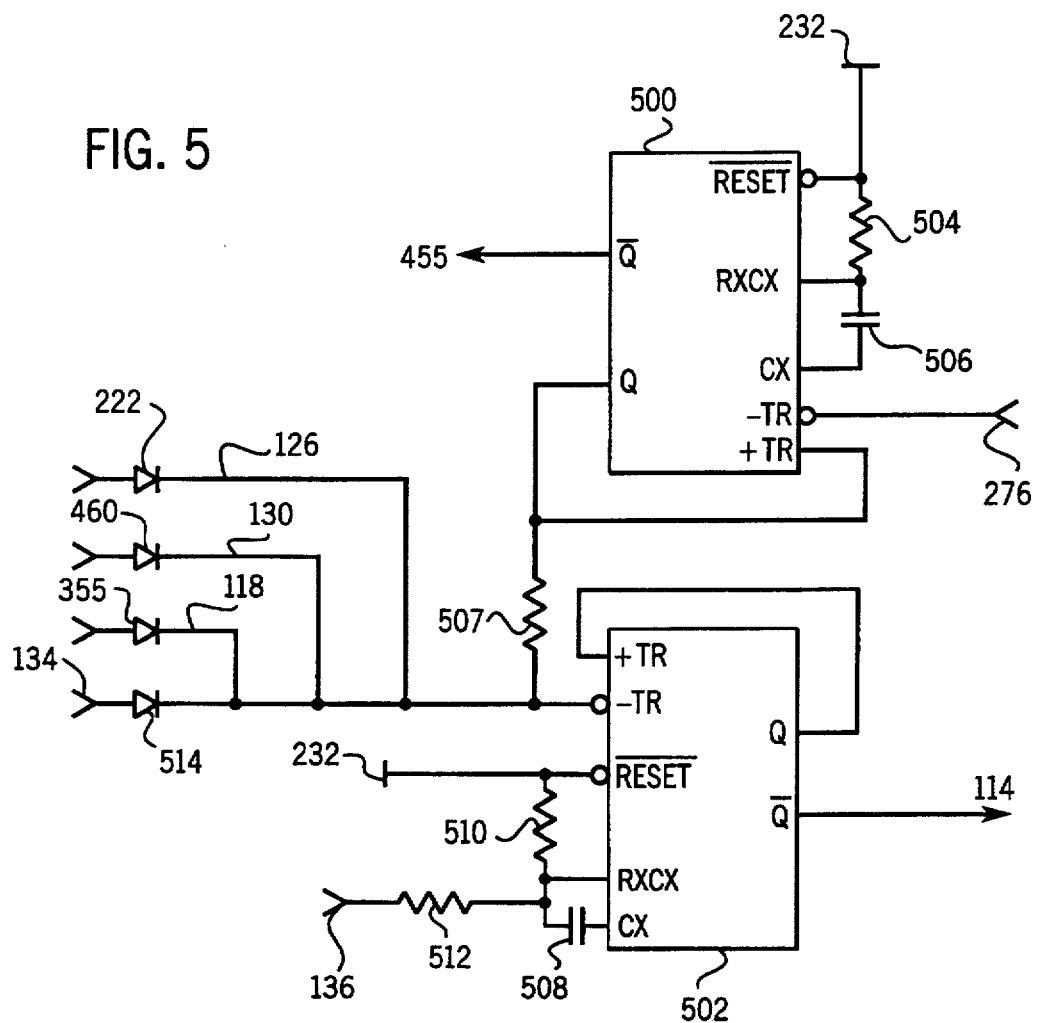
FIG. 5 is a schematic diagram of a preferred exemplary embodiment of the timing circuit shown in FIG. 1.

Referring now to FIG. 5, timing circuit 120 includes two conventional oscillating timers 500 and 502. The oscillating frequency of timer 500 is determined by resistor 504 and capacitor 506. Timer 500 provides the clocking signal 455 for generating the ramp in VCO 128. The clock signal also provides a deadband time to prevent any overlap in the switching of the switches in resonant converter 100. Timer 500 is synchronized to timer 502 by way of resistor 507.

Timer 502 provides the modulated gate drive signal 114. The oscillating frequency of timer 502 is determined either by the combination of capacitor 508 and resistor 510, or the combination of capacitor 508 and resistors 510 and 512. Current sense circuit 116 electrically connects resistor 512 to timing circuit 120 during the time the current in the switches in resonant converter 100 is ringing forward.

Timing circuit 120 receives four independent disabling commands which are diode OR'ed by diodes 222, 514, 460, and 355. Diode 222 disables switching if an overcurrent condition exists in the switches in resonant converter 100. Diode 514 disables switching if the circuit has received an OFF command. Diode 460 disables switching based on information received from VCO 128. Finally, diode 355 disables switching if capacitor voltage sense circuit 124 indicates that the peak voltages in resonant converter 100 will exceed safe operating levels.

Figure 6:
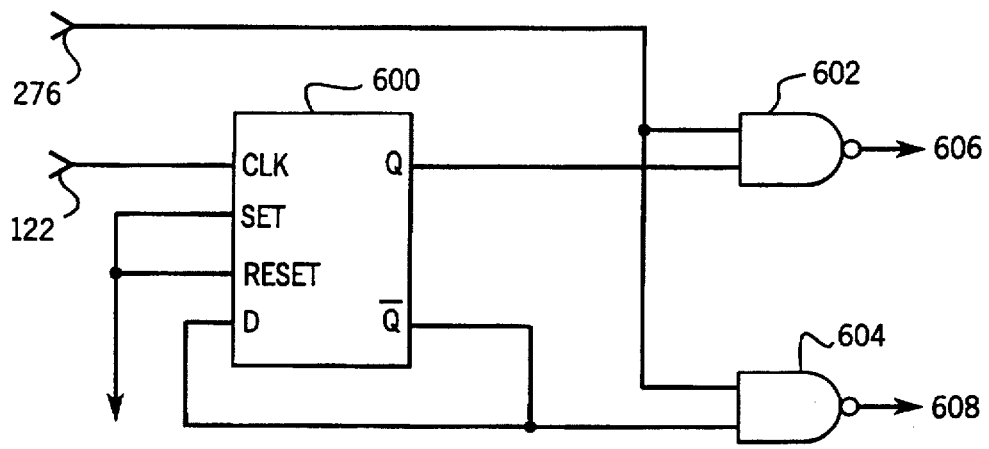
FIG. 6 is a schematic diagram of a preferred exemplary embodiment of the gate drive circuit shown in FIG. 1.

Referring now to FIG. 6, gate drive logic circuit 132 receives signals 276 and 122 from switch current sense circuit 116. Signal 122 provides a clock signal for D flipflop 600. Flipflop 600 then provides a clock signal and an inverted clock signal to one input of NAND gates 602 and 604, respectively. Signal 276 provides a modulated drive signal to the other input of NAND gates 602 and 604. Output signals 606 and 608 of NAND gates 602 and 604 then modulate the antiparallel switches in resonant converter 100.

The following tables give component values for each component of FIGS. 2–6. Of course, these values are merely exemplary and not intended to be limiting.

| REFERENCE NUMERAL | DESCRIPTION | TYPE/VALUE |
| --- | --- | --- |
| 200 | DIODE | 1N4934 |
| 202 | DIODE | 1N4934 |
| 204 | DIODE | 1N4934 |
| 206 | DIODE | 1N4934 |
| 208 | RESISTOR | 5 |
| 210 | RESISTOR | 10K |
| 212 | RESISTOR | 100K |
| 214 | SCHMITT TRIGGER | 40106 |
| 216 | SCHMITT TRIGGER | 40106 |
| 218 | RESISTOR | 10K |
| 220 | DIODE | 1N4148 |
| 222 | DIODE | 1N4148 |
| 224 | RESISTOR | 4.99K |
| 226 | RESISTOR | 4.75K |
| 228 | RESISTOR | 4.99K |
| 230 | RESISTOR | 4.75K |
| 232 | SIGNAL | +15V |
| 234 | DIODE | 1N4148 |
| 236 | COMPARATOR | 319 |
| 238 | DIODE | 1N4148 |
| 240 | COMPARATOR | 319 |
| 242 | SCHMITT TRIGGER | 40106 |
| 244 | SCHMITT TRIGGER | 40106 |
| 246 | SCHMITT TRIGGER | 40106 |
| 248 | RESISTOR | 4.75K |
| 250 | RESISTOR | 4.75K |
| 252 | SCHMITT TRIGGER | 40106 |
| 254 | RESISTOR | 4.75K |
| 256 | RESISTOR | 4.75K |
| 258 | DIODE | 1N4148 |
| 260 | DIODE | 1N4148 |
| 262 | RESISTOR | 4.75K |
| 264 | SCHMITT TRIGGER | 40106 |
| 266 | DIODE | 1N4148 |
| 268 | DIODE | 1N4148 |
| 270 | DIODE | 1N4148 |
| 272 | NAND GATE | 4093 |
| 274 | NAND GATE | 4093 |
| 276 | SIGNAL | modulated signal |
| 300 | RESISTOR | 1M |
| 302 | OP AMP | 347 |
| 304 | RESISTOR | 1M |
| 306 | RESISTOR | 1M |

-continued

| REFERENCE NUMERAL | DESCRIPTION | TYPE/VALUE |
|---|---|---|
| 308 | RESISTOR | 10K |
| 310 | RESISTOR | 10K |
| 312 | DIODE | 1N4148 |
| 314 | DIODE | 1N4148 |
| 316 | OP AMP | 347 |
| 318 | RESISTOR | 10K |
| 320 | RESISTOR | 10K |
| 322 | DIODE | 1N4148 |
| 324 | DIODE | 1N4148 |
| 326 | PNP TRANSISTOR | 2N2905 |
| 328 | CAPACITOR | 100pF |
| 330 | OP AMP | 347 |
| 332 | RESISTOR | 61.9K |
| 334 | OP AMP | 347 |
| 336 | RESISTOR | 61.9K |
| 338 | RESISTOR | 30.1K |
| 340 | RESISTOR | 121K |
| 342 | RESISTOR | 24.3K |
| 344 | SIGNAL | −15V |
| 345 | COMPARATOR | |
| 346 | DIODE | 1N4148 |
| 348 | RESISTOR | 10K |
| 350 | RESISTOR | 10K |
| 352 | SCHMITT TRIGGER | 40106 |
| 354 | D FLIPFLOP | 4013 |
| 355 | DIODE | 1N4148 |
| 356 | SCHMITT TRIGGER | 40106 |
| 358 | DIODE | 1N4148 |
| 360 | RESISTOR | 20K |
| 362 | CAPACITOR | .001uF |
| 400 | SIGNAL | COMMAND |
| 402 | OP AMP | 347 |
| 404 | RESISTOR | 1K |
| 406 | CAPACITOR | .01uF |
| 408 | RESISTOR | 499K |
| 410 | OP AMP | 347 |
| 414 | RESISTOR | 200K |
| 416 | RESISTOR | 10 |
| 418 | RESISTOR | 20 |
| 420 | RESISTOR | 499K |
| 422 | RESISTOR | 10K |
| 424 | OP AMP | 347 |
| 426 | RESISTOR | 39.2K |
| 428 | RESISTOR | 90.9K |
| 430 | CAPACITOR | .001uF |
| 432 | DIODE | 1N4148 |
| 434 | DIODE | 1N4148 |
| 436 | ZENER DIODE | 1N4741A |
| 438 | ZENER DIODE | 1N4741A |
| 440 | RESISTOR | 2K |
| 442 | CAPACITOR | .001uF |
| 444 | COMPARATOR | |
| 446 | RESISTOR | 20K |
| 448 | RESISTOR | 10K |
| 450 | RESISTOR | 10K |
| 452 | CAPACITOR | .001uF |
| 454 | PNP TRANSISTOR | 2N2905 |
| 455 | SIGNAL | CLOCK |
| 456 | ZENER DIODE | 1N4732A |
| 458 | RESISTOR | 10K |
| 460 | DIODE | 1N4148 |
| 500 | OSCILLATOR | 4098 |
| 502 | OSCILLATOR | 4098 |
| 504 | RESISTOR | 4.75K |
| 506 | CAPACITOR | 100pF |
| 507 | RESISTOR | 4.75K |
| 508 | CAPACITOR | .001uF |
| 510 | RESISTOR | 24.3K |
| 512 | RESISTOR | 4.75K |
| 514 | DIODE | 1N4148 |
| 600 | D FLIPFLOP | 4013 |
| 602 | NAND GATE | 4093 |
| 604 | NAND GATE | 4093 |
| 606 | SIGNAL | GATE DRIVE |
| 608 | SIGNAL | GATE DRIVE |

The inventors have invented, in one embodiment, a controller that electronically shapes the output V-A curve. This aspect of the invention may be used in conjunction with the trajectory control/protection aspect. More specifically, an output curve having a constant current portion (preferably in the welding range) is provided. Also, an adaptive hot start is provided, wherein the amount of energy used to hot start is responsive to the user's welding skill. These features—curve shaping and adaptive hot start—are particularly useful for stick welding applications.

In accordance with the present invention a switchable power source, such as the one described above, a different inverter power source, or any other switchable source, includes a controller that electronically shapes the output V-A curve. As used herein power source refers to the portion of the power supply that produces the power output. Any shape curve may be provided, but the inventors have found it particularly useful to provide a constant current curve in the welding range. By welding range it is meant at voltages such as those typically found across the output studs of the power supply when the welder is actually welding.

Figure 9:
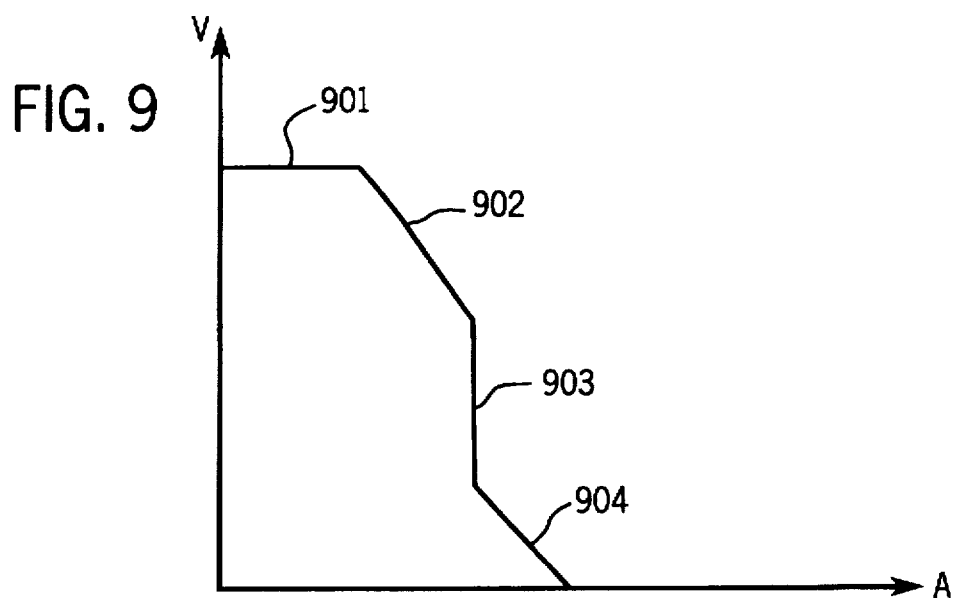
FIG. 9 is a graph showing a typical V-A output curve produced by a power supply made in accordance with the present invention.

Referring now to FIG. 9, a typical V-A curve electronically shaped in accordance with the invention is shown. The curve shown on FIG. 9 is the curve for a given user selected current (nominally the current of the CC or constant current portion of the V-A-curve). As may be seen in FIG. 9, a flat or CV (constant voltage) portion 901 of the curve is provided at low amperage. Also, a "droop" or sloped portion 902 of an V-A curve is provided between the CV and a CC portion 903 of the curve. The constant current portion (indicated by the vertical line) occurs over the voltages typically found under welding conditions. Thus, when the welder is in a normal welding process, the power supply behaves as a CC power supply. Finally, the output VA curve includes a "dig" portion 904 where the current increases with decreasing voltage. The maximum dig current, in accordance with the present invention, is adjustable by the user.

The controller of the present invention includes circuitry that allows an adaptive hot start to be used. Generally, the hot start is such that energy greater than the setpoint (twice the current setpoint in the preferred embodiment) is provided for all users. However, additional energy is provided, depending upon the output voltage. If the output voltage is less than the "dig" threshold (i.e., the voltage at which the dig current is provided) then an additional boost of energy is provided (the maximum dig current or 120 amps in the preferred embodiment). When the voltage is greater than the dig setpoint, the additional energy (the maximum dig current) is not provided. This continues for a predetermined time (between 125 and 150 milliseconds in the preferred embodiment).

Figure 10:
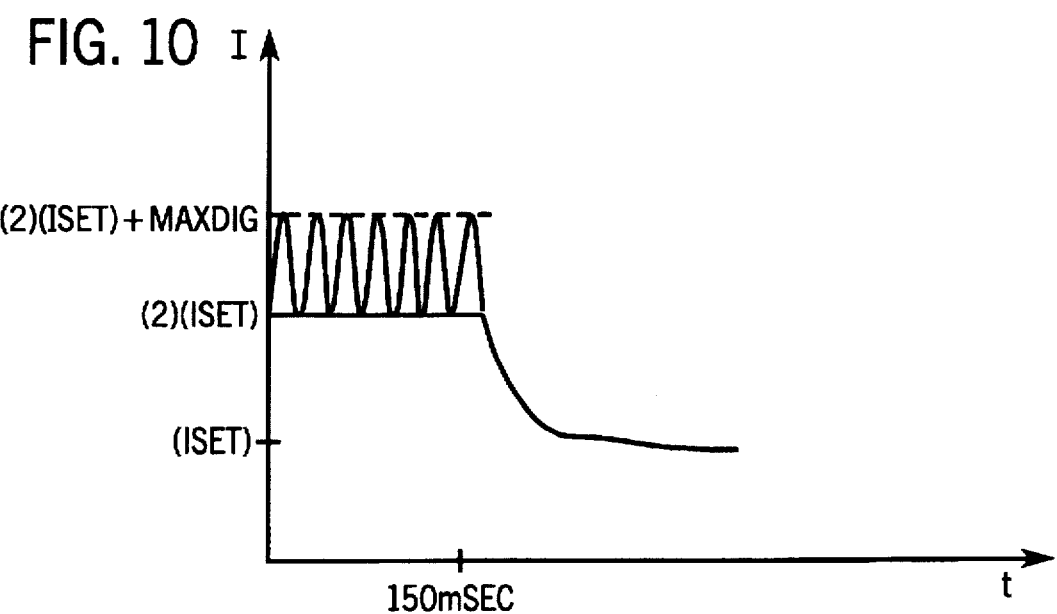
FIG. 10 is a graph showing a current as a function of time for a hot start in accordance with the present invention.

The resulting current, as a function of time, is shown in FIG. 10. As may be seen, the hot start provides, at a minimum, twice the user selected current. Also, very brief spikes of excess current are provided, as the voltage crosses above and below the dig setpoint. One feature of this type of start is that additional current is dependent on the welder's skill. Experienced welders are generally better at initiating the welding process, and are able to quickly maintain a voltage greater than the dig setpoint, thus fewer spikes of maximum dig current will be provided when a skilled welder uses this power supply. Less experienced welders cannot initiate the arc as easily, and need more current, and take longer to maintain an arc having a voltage greater than the dig threshold.

Figure 8:
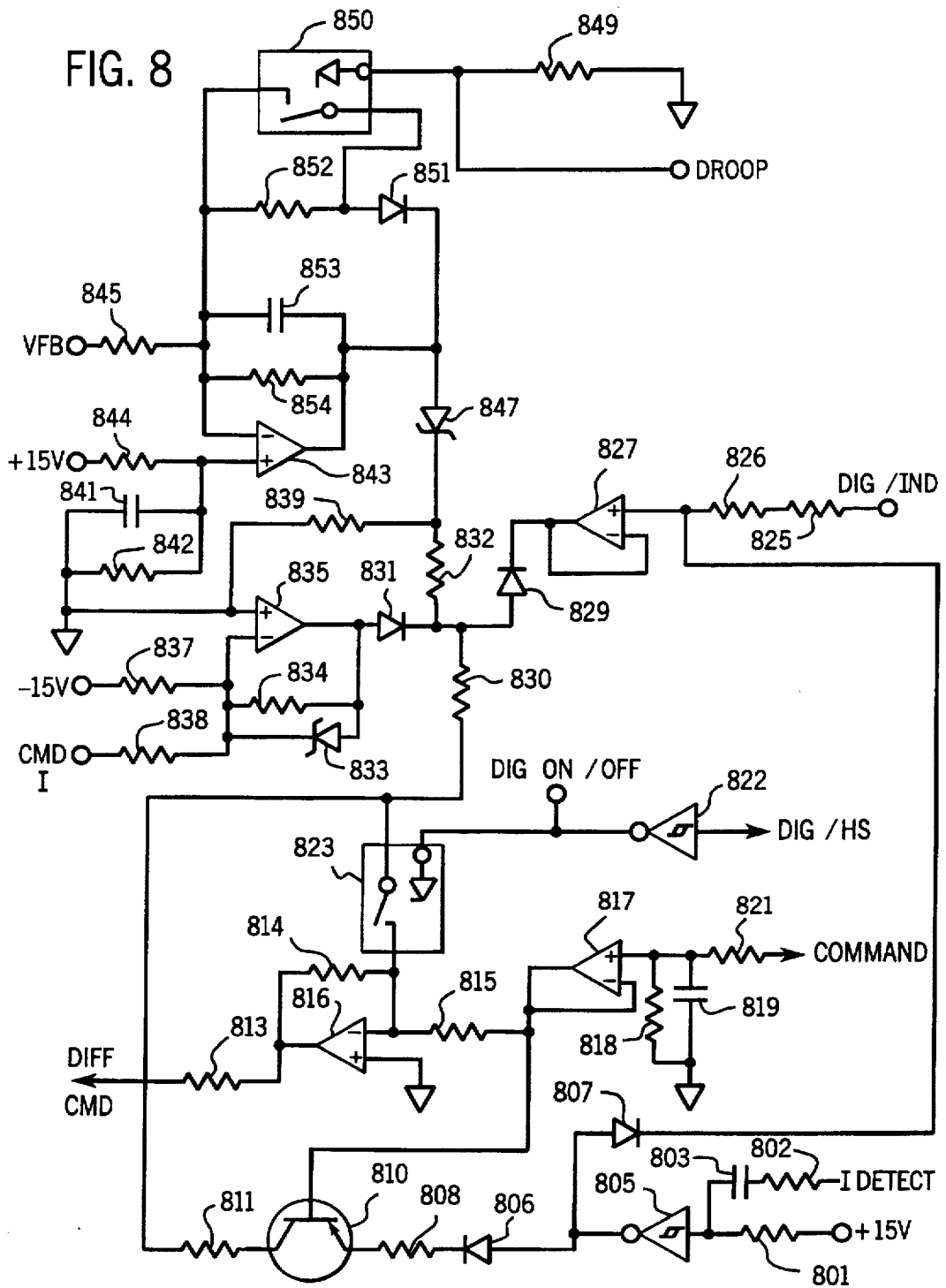
FIG. 8 is a schematic of circuitry used to implement a hot start and wave shaping in accordance with the present invention.

Referring now to FIG. 8, circuitry that provides curve shaping and an adaptive hot start is shown. Of course, the circuit shown is merely one embodiment of the invention, and many other circuit designs will be equally capable of implementing the present invention. FIG. 8 includes the portions of the controller that implement the hot start and curve shaping. Other portions, such as the feedback processing, timing, pulse generators, etc. may be of typical design such as those well known in the art.

A current command signal (COMMAND) derived from the user selectable desired current is provided through a resistor 821 (1K ohm), resistor 818 (499K ohms) and a capacitor 819 (0.01 micro F) to a buffer 817. The output of buffer 817 is provided (in addition to transistor 810) to a summing op amp 816 through a resistor 815 (200K ohms). Feedback resistor 814 (200K ohms) is also provided. Summing op amp 816 also receives the hot start signal (the output of transistor 810) through a resistor 811 (200K ohms) and a switch 823 (as will be described below, the droop and dig signals are also provided to summing op amp 816 through switch 823). Switch 823 is used to turn on and off the hot start and dig features, and receives, on a control input, a DIG/HS command through a Schmitt trigger 822.

The output of op amp 816 is a signal called DIFF CMD and is provided to a typical current regulator (not shown). The magnitude of the DIFF CMD signal indicates the desired current output, and, in combination with the actual current, will be used to determine the switching time.

The hot start signal is derived from an I DETECT signal, which indicates whether or not current exists. When current is present, a signal is provided to a Schmitt trigger 805 through a resistor 802 (20K ohms) and a capacitor 803 (0.47 micro F). The signal is timed by resistor 802, capacitor 803 and a resistor 801 (267K ohms) which is also tied to a +15 volt supply. The output of the Schmitt trigger is provided through a diode 806 and a resistor 808 (20K ohms) to a transistor 810. The base of transistor 810 receives a current command signal (after buffering). Thus, for a time determined by the RC combination, transistor 810 provides an output responsive to the selected current (COMMAND).

In the preferred embodiment the hot start signal is equal to the current command signal. Thus, during the time the hot start is active (determined by resistor 801 and capacitor 803), the DIFF CMD signal is raised by transistor 810 to be twice the magnitude corresponding to the current setpoint. As will be described below, during hot start the maximum dig current will also be summed at op amp 816.

After hot start has timed out (and DIFF CMD is no longer twice the user setpoint) a dig signal increases the DIFF CMD signal in response to the output voltage dropping below a predetermined threshold. In the preferred embodiment the threshold is 19.5 volts, and the absolute maximum dig current (the additional current) is approximately 170 amps. The slope of the dig current is generally linear, and ranges from 0 amps at cut in (19.5 volts) to 167 amps at 0 volts.

The dig signal is generally provided by an op amp 842 through switch 823 to summing op amp 816. Op amp 842 receives a signal corresponding to the 19.5 volt dig threshold on its noninverting input. The signal corresponding to 19.5 volts is derived from a +15 volt supply, a resistor 844 (22.1K ohms), a resistor 842 (2.67K ohms) and a capacitor 841 (0.1 microF).

A voltage feedback signal is provided to the inverting input of op amp 842 through a resistor 845 (16.2K ohms). The voltage feedback signal may be derived from the output studs in a well known fashion. A feedback resistor 854 (100K ohms) provides the appropriate gain to create the slope of the dig current (904 of FIG. 9). A capacitor 853 (0.01 microF) is also provided.

The output of op amp 842 is provided through a zener diode 847 (4.7 V) and a pair of resistors 832 (10K ohms) and 830 (4.75K ohms) to switch 823 and summing op amp 816. Zener diode 847 blocks the dig signal when the output voltage is greater than 19.5 volts. Thus, the output of summing op amp 816 includes, after the hot start, the desired current plus a dig current when the output voltage is less than 19.5 volts.

The maximum amount of dig current may be limited by the user to less than the absolute maximum with a potentiometer on the front panel of the welder. The output of the pot is a DIG/IND signal, and is provided through resistors 826 (20K ohms) and 825 (1K ohm) to op amp 827. The output of op amp 827 clamps the dig signal through a diode 882. Thus, when the DIG/IND signal limits the maximum dig current provided.

During hot start the dig signal is also provided to summing op amp 816. However, the user selectable maximum dig is overridden, and the absolute maximum dig is provided to help start the welding process. The override is the output of Schmitt trigger 805, (which stays high for the duration of the hot start). While the hot start is activated the output of Schmitt trigger 805 holds up the input of op amp 827, thus providing the absolute maximum dig during hot start. As may be seen, during hot start all users will obtain twice the current indicated by the current selection. Additionally, when the output voltage drops below 19.5 volts, indicating a touch start, the maximum dig current will be provided.

The droop portion of the output V-A curve (902 of FIG. 9) is also provided by op amp 842. When the output voltage exceeds 19.5 volts the output of op amp 842 becomes negative. Zener diode 847 blocks the signal creating the constant current portion (903 of FIG. 9) of the output curve. However, when the voltage feedback signal becomes large enough (approximately 30 arc volts) the zener breaks down, and the negative output of op amp 842 is summed by op amp 816. Thus, the DIFF CMD signal is decreased (less current is called for) and the droop is provided. In the droop range a resistor 852 (100K ohms) and a diode 851 are used as part of the feedback loop of op amp 842. A switch 850 may be used to short resistor 852, thus disabling the droop feature.

When the user selects low output current (below 45 amps e.g.) it is desirable to omit the droop altogether, also, for intermediate currents it may be desirable to limit the droop. An op amp 835 determines the minimum user selected current for which droop will be provided. Specifically, op amp 835 receives a CMD BUFF signal (the output of op amp 817 through a resistor 838 (5.1K ohms). A DC bias of −15 V is provided through a resistor 837 (68.1K ohms). A feedback resistor 834 (10K ohms) and a 3 volt zener diode 833 are provided. This resistor determines if droop is provided given the user selected current, as well as the maximum droop, and zener diode 833 also limits the maximum droop.

The preferred embodiment provides no droop for user selected currents of less than 45 amps, a droop down to 45 amps for user selected currents of between 45 and 90 amps, a droop down to one-half the user selected current for user selected currents between 90 and 106 amps, and a maximum droop of 53 amps for user selected currents greater than 106 amps.

Thus, the controller provides output V-A curves that includes an adaptive hot start feature, a constant current portion, a dig and a droop.

Thus, it should be apparent that there has been provided in accordance with the present invention a power supply that fully satisfies the objectives and advantages set forth above. Although the invention has been described in conjunction with specific embodiments thereof, it is evident that many alternatives, modifications and variations will be apparent to those skilled in the art. One such alternative is to use the series resonant converter described above in an induction heating application. Accordingly, it is intended to embrace all such alternatives, modifications and variations that fall within the spirit and broad scope of the appended claims.

The embodiments of the invention in which an exclusive property or privilege is claimed are defined as follows:

1. A welding power supply comprising:
   a series resonant converter, including at least one switch and at least one capacitor;
   a switching circuit including an enable input;
   a voltage sensing circuit for determining an earliest switching time of the at least one switch that will prevent a peak voltage on the capacitor from exceeding a predetermined threshold for a next cycle of the converter, wherein the voltage sensing circuit provides an enable signal to the enable input when the earliest switching time has passed, and wherein the switching circuit is enabled by the enable signal; and
   a pair of welding output terminals connected to the series resonant converter.

2. The apparatus of claim 1, wherein the switching circuit further includes a feedback input and the power supply further comprises a load current feedback circuit for determining a difference between a desired and an actual load current, wherein the load current feedback circuit provides a signal representative of the difference to the feedback input.

3. The apparatus of claim 2, wherein the voltage sensing circuit includes means for determining the earliest switching time using a single variable parameter.

4. The apparatus of claim 2, further including:
   means for measuring a capacitor voltage at a current zero crossing of the converter;
   means determining a voltage added in one cycle to the capacitor by a bus connected to supply voltage to the capacitor; and
   means, connected to the means for measuring and connected to the means for determining, for determining a voltage needed to be bled off the capacitor in one cycle to prevent the peak voltage on the capacitor from exceeding the predetermined threshold and for providing the enable signal after the voltage needed has been reached.

5. The apparatus of claim 4, wherein the voltage sensing circuit includes:
   means for measuring the capacitor voltage at a current zero crossing of the converter;
   means for measuring a current in the converter; and
   means for selecting a capacitor voltage above which the at least one switch cannot be fired utilizing empirical data for a plurality of peak capacitor voltages and a plurality of converter currents.

6. A method of providing a welding current to a load from a bus current using a series resonant converter power supply, the converter including at least one switch and at least one capacitor, comprising the steps of:
   determining an earliest switching time that will prevent a peak voltage on the capacitor from exceeding a predetermined threshold in a next cycle of the converter;
   inhibiting a switching of the at least one switch until the earliest switching time has passed; and
   providing an output of the converter to a welding arc.

7. The method of claim 6, further including the steps of:
   determining a switching time necessary to provide a desired output current; and
   switching the at least one switch at a later of the time necessary to provide a desired output current and the earliest switching time that will prevent the peak voltage on the capacitor from exceeding the predetermined threshold.

8. The method of claim 7, wherein the step of determining the earliest switching time includes the step of using a single variable parameter to determine the earliest switching time that will prevent the peak voltage on the capacitor from exceeding a predetermined threshold.

9. The method of claim 7, wherein the step of determining the earliest switching time includes the steps of:
   measuring a capacitor voltage at a current zero crossing of the converter;
   determining a voltage added in one cycle to the capacitor by the bus; and
   determining a voltage needed to be bled off the capacitor in one cycle to prevent the peak voltage on the capacitor from exceeding the predetermined threshold.

10. The method of claim 8, wherein the step of determining the earliest switching time includes the steps of:
    measuring a capacitor voltage at a current zero crossing of the converter;
    measuring a current of the converter; and
    selecting a capacitor voltage above which the at least one switch cannot be fired utilizing empirical data for a plurality of peak capacitor voltages and a plurality of converter currents.

11. A method of providing an output current to a load from a bus current using a series resonant converter power supply, the converter including at least one switch and at least one capacitor, comprising the steps of:
    determining an earliest switching time that will prevent a peak voltage on the capacitor from exceeding a predetermined threshold in a next cycle of the converter;
    inhibiting a switching of the at least one switch until the earliest switching time has passed; and
    providing an output of the converter to the load.

12. The method of claim 11, further including the steps of:
    determining a switching time necessary to provide a desired output current; and
    switching the at least one switch at a later of the time necessary to provide a desired output current and the earliest switching time that will prevent the peak voltage on the capacitor from exceeding the predetermined threshold.

13. The method of claim 12, wherein the step of determining the earliest switching time includes the step of using a single variable parameter to determine the earliest switching time that will prevent the peak voltage on the capacitor from exceeding a predetermined threshold.

14. The method of claim 12, wherein the step of determining the earliest switching time includes the steps of:
    measuring a capacitor voltage at a current zero crossing of the converter;
    determining a voltage added in one cycle to the capacitor by the bus; and
    determining a voltage needed to be bled off the capacitor in one cycle to prevent the peak voltage on the capacitor from exceeding the predetermined threshold.

17

15. The method of claim 13, wherein the step of determining the earliest switching time includes the steps of:

measuring a capacitor voltage at a current zero crossing of the converter;

measuring a current of the converter; and selecting a capacitor voltage above which the at least one switch cannot be fired utilizing empirical data for a plurality of peak capacitor voltages and a plurality of converter currents.

16. The method of claim 13, wherein the step of selecting a capacitor voltage includes accessing data in a digital lookup table.

17. The method of claim 13, wherein the step of selecting a capacitor voltage includes the steps of making an analog comparison based on the measured capacitor voltage and the measured converter current and shifting a curve implementing the empirical data.

18. A power supply comprising:

a series resonant converter, including at least one switch and at least one capacitor;

a switching circuit including an enable input;

a voltage sensing circuit for determining an earliest switching time of the at least one switch that will prevent a peak voltage on the capacitor from exceeding a predetermined threshold for a next cycle of the converter, wherein the voltage sensing circuit provides an enable signal to the enable input when the earliest switching time has passed, and wherein the switching circuit is enabled by the enable signal; and a pair of output terminals connected to the series resonant converter.

19. The apparatus of claim 18, wherein the switching circuit further includes a feedback input and the power supply further comprises a load current feedback circuit for determining a difference between a desired and an actual load current, wherein the load current feedback circuit provides a signal representative of the difference to the feedback input.

20. The apparatus of claim 19, wherein the voltage sensing circuit includes means for determining the earliest switching time using a single variable parameter.

21. The apparatus of claim 20, further including:

means for measuring a capacitor voltage at a current zero crossing of the converter;

means determining a voltage added in one cycle to the capacitor by a bus connected to supply voltage to the capacitor; and means, connected to the means for measuring and connected to the means for determining, for determining a voltage needed to be bled off the capacitor in one cycle to prevent the peak voltage on the capacitor from exceeding the predetermined threshold and for providing the enable signal after the voltage needed has been reached.

22. The apparatus of claim 20, wherein the voltage sensing circuit includes:

means for measuring the capacitor voltage at a current zero crossing of the converter;

means for measuring a current in the converter; and means for selecting a capacitor voltage above which the at least one switch cannot be fired utilizing empirical data for a plurality of peak capacitor voltages and a plurality of converter currents.

23. The apparatus of claim 20, wherein the means for selecting a capacitor voltage includes a digital look-up table.

18

24. The apparatus of claim 20, wherein the means for selecting a capacitor voltage includes an analog circuit for making a comparison based on the measured capacitor voltage and the measured converter current and for shifting a curve implementing the empirical data.

25. A method of providing an induction heating current to an induction head from a bus current using a series resonant converter power supply, the converter including at least one switch and at least one capacitor, comprising the steps of:

determining an earliest switching time that will prevent a peak voltage on the capacitor from exceeding a predetermined threshold in a next cycle of the converter;

inhibiting a switching of the at least one switch until the earliest switching time has passed; and providing an output of the converter to the induction head.

26. The method of claim 25, further including the steps of:

determining a switching time necessary to provide a desired output current; and switching the at least one switch at a later of the time necessary to provide a desired output current and the earliest switching time that will prevent the peak voltage on the capacitor from exceeding the predetermined threshold.

27. The method of claim 26, wherein the step of determining the earliest switching time includes the step of using a single variable parameter to determine the earliest switching time that will prevent the peak voltage on the capacitor from exceeding a predetermined threshold.

28. The method of claim 26, wherein the step of determining the earliest switching time includes the steps of:

measuring a capacitor voltage at a current zero crossing of the converter;

determining a voltage added in one cycle to the capacitor by the bus; and determining a voltage needed to be bled off the capacitor in one cycle to prevent the peak voltage on the capacitor from exceeding the predetermined threshold.

29. The method of claim 26, wherein the step of determining the earliest switching time includes the steps of:

measuring a capacitor voltage at a current zero crossing of the converter;

measuring a current of the converter; and selecting a capacitor voltage above which the at least one switch cannot be fired utilizing empirical data for a plurality of peak capacitor voltages and a plurality of converter currents.

30. An induction heating power supply comprising:

a series resonant converter, including at least one switch and at least one capacitor;

a switching circuit including an enable input;

a voltage sensing circuit for determining an earliest switching time of the at least one switch that will prevent a peak voltage on the capacitor from exceeding a predetermined threshold for a next cycle of the converter, wherein the voltage sensing circuit provides an enable signal to the enable input when the earliest switching time has passed, and wherein the switching circuit is enabled by the enable signal; and a pair of induction heating output terminals connected to the series resonant converter.

31. The apparatus of claim 30, wherein the switching circuit further includes a feedback input and the power supply further comprises a load current feedback circuit for determining a difference between a desired and an actual load current, wherein the load current feedback circuit provides a signal representative of the difference to the feedback input.

32. The apparatus of claim 31, wherein the voltage sensing circuit includes means for determining the earliest switching time using a single variable parameter.

33. The apparatus of claim 31, further including:

means for measuring a capacitor voltage at a current zero crossing of the converter;

means determining a voltage added in one cycle to the capacitor by a bus connected to supply voltage to the capacitor; and means, connected to the means for measuring and connected to the means for determining, for determining a voltage needed to be bled off the capacitor in one cycle to prevent the peak voltage on the capacitor from exceeding the predetermined threshold and for providing the enable signal after the voltage needed has been reached.

34. The apparatus of claim 32, wherein the voltage sensing circuit includes:

means for measuring the capacitor voltage at a current zero crossing of the converter;

means for measuring a current in the converter; and means for selecting a capacitor voltage above which the at least one switch cannot be fired utilizing empirical data for a plurality of peak capacitor voltages and a plurality of converter currents.

\* \* \* \* \*